I. D. WRIGHT.
FISHING REEL.
APPLICATION FILED JUNE 22, 1910.
983,013.
Patented Jan. 31, 1911.
2 SHEETS—SHEET 2.
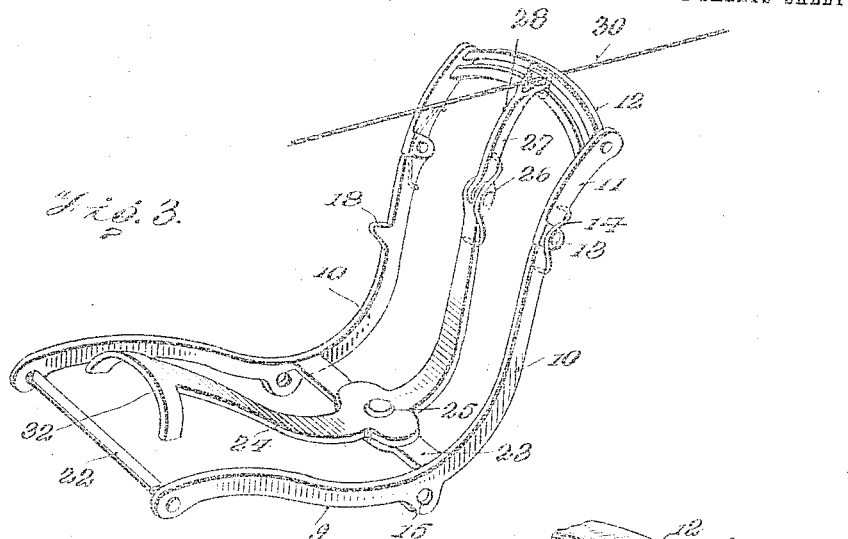
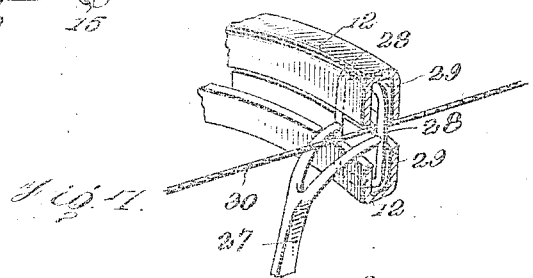
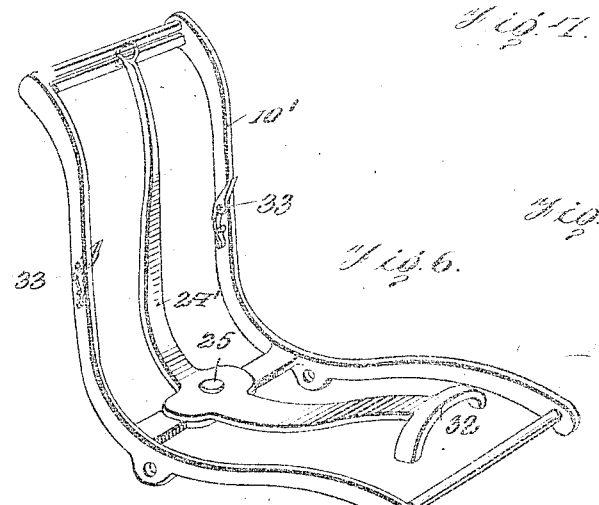
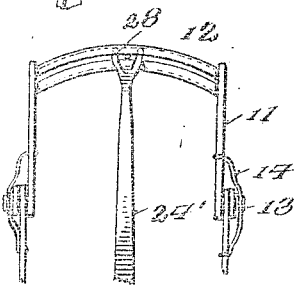
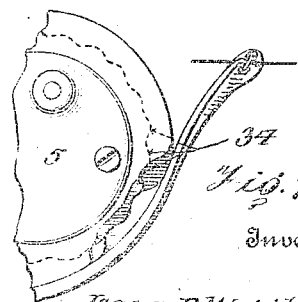
Inventor
Isaac D. Wright
Witnesses
By _____, Attorneys

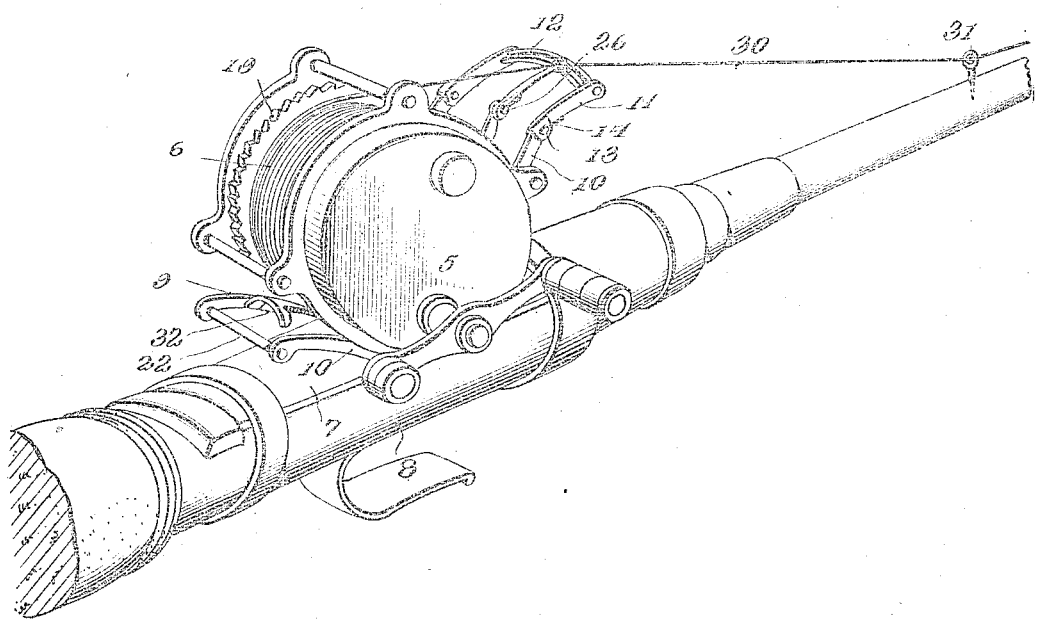
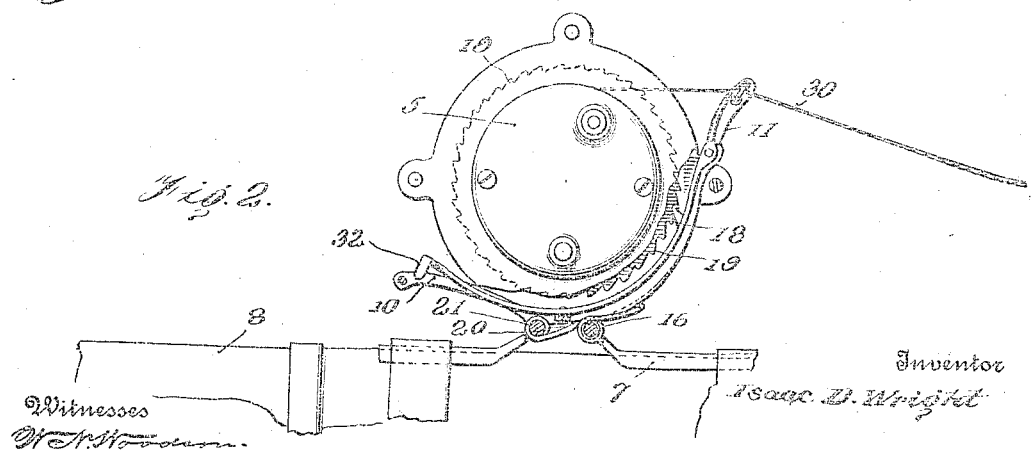

UNITED STATES PATENT OFFICE.

ISAAC D. WRIGHT, OF PITTSBURG, KANSAS.

FISHING-REEL.

983,013. Specification of Letters Patent. Patented Jan. 31, 1911.

Application filed June 22, 1910. Serial No. 568,394.

*To all whom it may concern:*

Be it known that I, ISAAC D. WRIGHT, citizen of the United States, residing at Pittsburg, in the county of Crawford and State of Kansas, have invented certain new and useful Improvements in Fishing-Reels, of which the following is a specification.

This invention relates to fishing reels and has for its object to provide improved means for arresting the rotary movement of the reel when casting a line, thereby to prevent back lashing.

A further object of the invention is to provide a reel having a rocking frame or yoke pivotally mounted thereon and provided with means for engagement with a winding drum, said yoke or frame being movable out of engagement with the drum by the weight of the line when making a cast and movable automatically into engagement therewith when the line is slack.

A further object is to provide means for guiding the line and winding the latter evenly upon the drum.

A further object is to provide means for reducing friction between the line and guiding means in case of excessive strain of the former.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a fishing reel provided with an automatic stop constructed in accordance with my invention, showing the line under tension. Fig. 2 is a vertical sectional view, showing the line slack and the tooth on the pivoted yoke engaging the teeth on the drum; Fig. 3 is a perspective view of the yoke detached, showing the line guiding mechanism in position thereon; Fig. 4 is a detail perspective view partly in section of the arcuate guiding bars for the line guiding mechanism; Fig. 5 is a plan view illustrating a modified form of the invention; Fig. 6 is a perspective view illustrating a further modification; Fig. 7 is a detail side elevation with the casing broken away, showing a drag for arresting the rotary movement of the reel; Fig. 8 is a side elevation partly in section, showing the teeth on the reel housed within a casing.

The improved automatic stop forming the subject matter of the present invention is principally designed for attachment to fishing reels and by way of illustration is shown in connection with a reel of the ordinary construction in which 5 designates the casing, 6 the winding drum and 7 the attaching plate for supporting the reel on a pole 8.

The device comprises a rocking frame or yoke 9 including spaced side bars 10 which bear against the inner walls of the casing 5 and are curved to conform to the shape of the drum, as shown. The forward ends of the side bars 10 are extended laterally beyond the lines of the casing 5 to permit the attachment of auxiliary or extension bars 11, said extension bars being connected by spaced transverse bars 12 preferably formed of channel iron and having their intermediate portions outwardly bowed for the purpose hereinafter referred to. The extension bars 11 are pivotally connected to the side bars 10, as indicated at 13, there being springs 14 extending across the pivot pins 13 and serving to normally and yieldably support the extension bars in alinement with the side bars of the yoke.

The intermediate portions of the side bars 10 are formed with perforated ears 15, which receive one of the transverse connecting posts 16 of the reel casing and upon which the yoke is pivotally mounted for swinging movement. Extending inwardly from one or both arms 10 of the yoke, is a tooth or pawl 18 adapted to engage suitable ratchet teeth 19 formed in the peripheral edge of one of the flanges of the winding drum, thus to automatically arrest the rotary movement of said drum.

As a means for normally and yieldably holding the tooth 18 in engagement with the ratchet teeth on the winding drum, there is provided a coil spring 20 having its intermediate portion wrapped around the post 16 and its opposite ends bearing against one of the side bars 10 of the yoke and a similar connecting post 21. The side bars 10 are also connected by terminal and intermediate transverse bars 22 and 23. The intermediate bar 23 being flat and forming a support for a hand lever 24. The intermediate portion of the hand lever 24 is pivotally mounted at 25 on the bar 23, while the forward end thereof is curved upwardly and pivotally connected at 26 with the shank 27 of a guiding member 28. The guiding member 28 is preferably in the form of a loop or eye, which fits within the grooves 29 formed by the channel irons 12, the latter being preferably bowed outwardly so as to permit sliding movement of the line receiving eye within the groove without binding or wedging action between the parts.

The loop or eye 28 may be formed of metal, agate or other suitable material so as to prevent injury to the line 30. One end of the line 30 is wound upon the drum 6, while the free end thereof extends through the loop or eye 28 and thence through suitable guiding loops or eyes 31 on the pole in the usual manner.

Thus it will be seen that when casting the line, the weight of the latter will depress the forward end of the rocking frame or yoke so as to disengage the pawl or tooth 18 from engagement with the ratchet teeth 19, thus releasing the winding drum and permitting the line to unwind from the reel. At the end of the casting operation, the line being slack and the weight removed from the pivoted end of the rocking frame, the spring 20 will force the tooth or pawl 18 into engagement with the teeth on the drum and automatically arrest the rotary movement of the drum, thereby to prevent back lashing.

By having the extension arms pivotally connected with and yieldably supported on the rocking frame or yoke, said extension arms are free to yield laterally in case of excessive strain on the line, thus to prevent undue friction between the line and the guiding eye 28. It will be noted however, that the tension of the spring 14 is greater than the tension of the spring 20 so that under normal conditions, the extension arms or frame 11 will not be tilted laterally, but only in case of excessive strain on the line.

The pivotal connection 26 between the hand lever 24 and shank 27 of the guiding member, permits said guiding member to be tilted laterally with the extension arms or frame 11, as will be readily understood. The rear end of the lever 24 is provided with a transversely disposed concavo-convex finger piece 32, by means of which the lever 24 may be actuated to wind the line evenly upon the drum. In order to wind the line upon the drum, an upward and inward pressure is exerted on the transverse connecting bar 22, which disengages the pawl 18 from the ratchet teeth 19, after which the finger piece 32 is moved laterally which causes the eye 28 to guide the line evenly on the reel. The same result however, may be accomplished without the necessity of first moving the yoke, by pressing upwardly on the finger piece 32 and at the same time moving said finger piece laterally, this being due to the fact that the lever 24 is carried by and secured to the rocking frame or yoke, as will be readily understood. The tooth or pawl 18 may also be moved into and out of engagement with the ratchet teeth on the drum by pressing upwardly or downwardly on the rear connecting bar 22 of the yoke, as the case may be.

If desired, the upper or forward end of the hand lever 24', instead of being pivotally connected with the shank of the guiding member, may be formed integral therewith and may be made of relatively thin metal so as to permit said guiding member to move in unison with the extension frame 11, when said frame is swung laterally, as best shown in Fig. 5 of the drawings.

In Fig. 6 of the drawings there is illustrated a modified form of the invention, in which the extension bars or frame 11 is dispensed with, the side bars 10' of the yoke or frame being continuous throughout their entire length. In this form of the device, the upper ends of the side bars 10' are connected by straight transverse bars and suitable spring actuated pawls 33 pivotally mounted on the inner faces of the side bars 10 for engagement with the ratchet teeth 19, in lieu of the rigid pawls.

In some cases, one or both flanges of the winding drum may be formed with a roughened or corrugated surface 34 and a portion of the yoke formed with a similar surface, as best shown in Fig. 7 of the drawings, so as to form in effect a drag instead of a positive stop for retarding the rotary movement of the winding reel.

It will of course be understood that the yokes may be made in different sizes and shapes, and nickeled, japanned or otherwise coated to protect the same against the action of the elements and also to give the device a neat, attractive appearance.

It will be understood that the ratchet teeth may be incased if desired as shown in Fig. 8, in which event a single opening will be formed in the casing to permit the entrance of the pawl. It will also be understood that a roller 35 may be mounted on the forward end of the pivoted frame or yoke for guiding the line in lieu of the transverse bars, as best shown in Fig. 8 of the drawings.

Having thus described the invention, what is claimed as new is:

1. The combination with a fishing reel including a support and a winding drum, of a rocking frame mounted on the support and movable out of engagement with the drum by engagement with a line when the latter is under tension and into engagement with the drum when the line is slack, and means carried by and movable independently of the rocking frame for guiding the line to said winding drum.

2. The combination with a fishing reel including a support and a winding drum, of a rocking frame pivotally mounted on the support, a line guiding member mounted on and movable laterally of the frame, and retarding means mounted on the frame and movable out of engagement with the drum when the line is under tension and movable into engagement with said drum when the line is slack, thereby to arrest the rotary movement of the drum.

3. The combination with a fishing reel including a support and a winding drum, of a rocking frame pivotally mounted on the support and normally held in engagement with the drum, and a line guiding member pivotally mounted for lateral movement on the rocking frame, said frame being movable out of engagement with the drum when the line is under tension and movable automatically into engagement with the drum when the line is slack.

4. The combination with a fishing reel including a support and winding drum having ratchet teeth, of a rocking frame pivotally mounted on the support and provided with a pawl normally engaging the teeth and a lever pivotally mounted on the rocking frame and provided with means for guiding the line to the winding drum, said frame being actuated to disengage the pawl from the teeth on the drum when the line is under tension and operable automatically to move the pawl into engagement with the teeth, thereby to arrest the rotary movement of the reel when the line is slack.

5. The combination with a fishing reel including a support and a winding drum, of a rocking frame pivotally mounted on the support and provided with a yieldably supported extension frame, a line guiding member slidably mounted for lateral movement on the extension frame, and retarding means carried by the frame and normally engaging the drum, said retarding means being movable to released position when the line is under tension and to operative position when the line is slack.

6. The combination with a fishing reel including a support and a winding drum, of a rocking frame pivotally mounted on the support, a lever pivotally mounted on the rocking frame and having one end thereof provided with a finger piece and its other end formed with a line receiving member, and retarding means carried by the pivoted frame and movable into engagement with the drum when the line is slack and movable out of engagement therewith when the line is under tension.

7. The combination with a fishing reel including a support and a winding drum, of a rocking frame pivotally mounted on the support, bars connecting the upper end of the rocking frame and provided with guiding grooves, a lever pivotally mounted on the frame and having a line receiving member seated in said grooves for guiding the line on the reel, and retarding means carried by the pivoted frame and movable into engagement with the drum when the line is slack and movable out of engagement therewith when the line is under tension.

8. The combination with a fishing reel including a support and a winding drum, of a rocking frame pivotally mounted on the support and including spaced side bars connected at their forward ends by transverse guide bars, a lever pivotally mounted on the frame and having one end thereof provided with a finger piece and its other end formed with a line receiving eye slidably mounted on the guide bars, and retarding means carried by one of the side bars of the frame, and movable into engagement with the drum for arresting the rotary movement thereof when the line is slack and movable out of engagement therewith when the line is under tension.

9. The combination with a fishing reel including a support and a winding drum, of a rocking frame pivotally mounted on the support, an extension frame yieldably supported on the first mentioned frame, a lever pivotally mounted on the rocking frame and provided with a line guiding member normally supported on the extension frame, and retarding means carried by the rocking frame and movable into engagement with the drum when the line is slack and movable out of engagement therewith when the line is under tension.

10. The combination with a fishing reel including a support and a winding drum, of a rocking frame pivotally mounted on the support, an extension frame yieldably supported on one end of the rocking frame, a lever pivotally mounted on the rocking frame, a line guiding member resting on the extension frame and provided with a shank having a pivotal connection with said lever, and retarding means carried by the rocking frame and movable into engagement with the drum when the line is slack and movable out of engagement therewith when the line is under tension.

11. The combination with a fishing reel including a support and winding drum, of a rocking frame mounted on the support, and a line guiding member co-acting with and movable laterally of the rocking frame, said rocking frame being movable out of engagement with the drum by contact with a line when the latter is under tension and into engagement with the drum when the line is slack.

12. The combination with a fishing reel including a support and winding drum, of a rocking frame mounted on the support and provided with a yieldably supported extension, and retarding means carried by the rocking frame and movable out of engagement with the drum when the line is under tension and movable into engagement with said drum when the line is slack, said extension being movable independently of the main body of the rocking frame and arranged to swing downwardly before the retarding means is disengaged from the drum.

In testimony whereof, I affix my signature in presence of two witnesses.

ISAAC D. WRIGHT. [L. s.]

Witnesses:
 FRANCIS D. BARKER,
 ARTHUR L. WRIGHT.